Patented Jan. 14, 1941

2,228,752

UNITED STATES PATENT OFFICE 2,228,752

PROCESS FOR THE SEPARATION OF DIVIN-YLACETYLENE AND ETHINYLBUTADIENE AND THE PREPARATION OF THE LATTER IN PURIFIED FORM

Albert Smith Carter, Wilmington, Del., assignor to E. I. du Pont de Nemours & Company, Wilmington, Del., a corporation of Delaware No Drawing. Application July 4, 1939,
Serial No. 282,813

13 Claims. (Cl. 260—678)

This invention relates to polymerizable compounds, more particularly to aliphatic unsaturated compounds and still more particularly to hexadiene-1,3-yne-5,

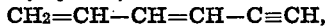

hereinafter called ethinylbutadiene, and its isomer hexadiene-1,5-yne-3,

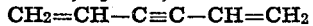

hereinafter called divinylacetylene. More particularly, it relates to the separation from crude divinylacetylene of pure divinylacetylene and pure ethinylbutadiene.

This application is a continuation in part of copending application Serial Number 155,923 filed July 27, 1937, which has now matured into U. S. Patent No. 2,173,272, issued September 19, 1939.

In U. S. Patent No. 1,811,959, Nieuwland describes a new process by which acetylene may be polymerized to nonbenzenoid polymers of acetylene. Among the polymers of acetylene so obtained is divinylacetylene, first disclosed in the above patent. The process described in this patent, as well as in later patents of others, gives a divinylacetylene which is essentially constant boiling and which was thought to be a homogeneous substance.

If this divinylacetylene is tested for the presence of acetylenic hydrogen, however, positive results are obtained which indicate the presence of small amounts of a material other than divinylacetylene. The amounts of this other material vary with variations in the broad Nieuwland process and range from about 4% to about 10% by weight of the divinylacetylene even after extensive fractional distillation. This other material has been found to be hexadiene-1,3-yne-5, an isomer of divinylacetylene, having the structural formula $CH_2=CH-CH=CH-C\equiv CH$. There is thus a characteristic difference between divinylacetylene and ethinylbutadiene in that the ethinylbutadiene contains a $-C\equiv CH$ group whereas divinylacetylene does not.

It is an object of this invention to provide a process for obtaining divinylacetylene in a purer state than has hitherto been possible. A further object is to isolate ethinylbutadiene from crude divinylacetylene and obtain it in a form in which it is substantially free of divinylacetylene. Other objects will appear hereinafter.

These objects are accomplished by bringing divinylacetylene containing ethinylbutadiene into contact with a solution of a salt of cuprous copper, silver or mercury, which solution is more alkaline than about pH 6.9, whereby the ethinylbutadiene is converted into a derivative which is readily separated from the divinylacetylene. The metal salt reacts with the $-C\equiv CH$ group in the ethinylbutadiene.

The metal salt in the substantially neutral or alkaline solution is dissolved in a solvent in which the salt of ethinylbutadiene formed with the metal of the metal salt is insoluble so that when the ethinylbutadiene is brought into contact with the substantially neutral or alkaline metal salt solution a metal derivative of the ethinylbutadiene is precipitated. This derivative may be separated very easily from the divinylacetylene and may be further treated with alkali cyanides or dilute acids to regenerate and recover the ethinylbutadiene. Preferably, the solvent in the metal salt solution is water but it may also be another liquid having the requisite property, such as an alcohol.

Ethinylbutadiene obtainable from its metal salts by treating the metal salts with alkali cyanides or dilute acids, is a volatile liquid, which upon analysis is found to have the composition $C_6H_6$. It is thus isomeric with divinylacetylene. Reaction of this hydrocarbon with maleic anhydride shows that it contains a conjugated system of double bonds. This, together with the fact that it has an acetylenic hydrogen, limits the choice of formulas to

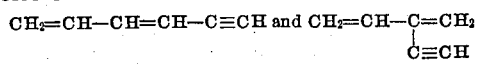

The behavior of the maleic anhydride addition product indicates that the second of these formulas is quite improbable for stereochemical reasons. The isomer of divinylacetylene is therefore hexadiene-1,3-yne-5 or ethinylbutadiene.

Ethinylbutadiene is a volatile colorless liquid which polymerizes to a viscous liquid, then to a hard solid when exposed to air. It is very sensitive to oxygen and light, rapidly becoming yellow. It can be stabilized by addition of small amounts of the usual antioxidants.

Divinylacetylene purified by removal of ethinylbutadiene no longer shows the presence of acetylenic hydrogen. It is then much less sensitive to light, remaining (when stabilized) water-white for more than two months, as contrasted with ordinary divinylacetylene which rapidly becomes yellow under the same conditions. The polymers derived from pure divinylacetylene show an improved stability towards light.

The table shows some of the physical properties of pure divinylacetylene and pure ethinylbutadiene.

Table

|  | Divinyl-acetylene | Ethinyl-butadiene |
|---|---|---|
| Melting point ............................ °C | −87.83 | −81.03 |
| Boiling point {250 mm ............ °C | 52.5 | 51.0 |
| {760 mm ............ °C | 85.0 | 83.4 |
| Density ($d_4^{20}$) | 0.7759 | 0.7734 |
| Refractive index ($N_D^{20}$) | 1.50474 | 1.50953 |
| Molecular refraction (obs.) | 29.82 | 30.16 |
| Molecular refraction (calcd.) | 26.97 | 26.97 |

The invention will be better understood by a consideration of the following examples, which are intended as illustrations only, however, and are thus not intended to be construed as limitations. Throughout these examples the parts are given by weight unless otherwise indicated and as in the remainder of the specification and claims the temperatures are expressed as °C.

Example 1

Seven hundred and ninety parts of crude divinylacetylene (the fraction boiling from 48° to 52° at 250 mm.) was stirred for 30 minutes with a solution made by dissolving 100 parts of $Cu_2Cl_2$ in 300 parts of concentrated $NH_4OH$ and 100 parts of water and, while still warm, adding 5 parts of hydroxylamine hydrochloride which reduced most of the cupric copper present. A heavy orange-yellow precipitate of the cuprous acetylide formed and became suspended for the most part in the divinylacetylene layer. The major portion of the divinylacetylene was then distilled off at 100 mm., the temperature of the mixture being kept below 40°. The lumps of the copper precipitate were then broken up and dispersed by adding more ammonia and water and the distillation was continued at 30 mm. until water-insoluble material ceased to be condensed in a cold trap in the system. An additional 100 parts of water was then distilled to assure the complete removal of divinylacetylene. The orange precipitate was then filtered and washed with dilute ammonia, then ethanol containing a little ammonia. To further assure the removal of divinylacetylene, the precipitate was suspended again in ethanol, washed and air-dried. Ninety-five parts of product were obtained, corresponding to 6.7% of isomer in the divinylacetylene.

The precipitate, which was not wet by water, was suspended in water containing a wetting agent, treated with 100 parts of sodium cyanide and steam distilled. Thirty-five parts of ethinylbutadiene (4.4% of the crude divinylacetylene) came over rapidly, followed by 3 parts of much less volatile liquid which was collected separately. The ethinylbutadiene was stabilized with thiodiphenylamine, dried with $MgSO_4$ and distilled at 250 mm. thru a short fractionating column. After collecting foreshots amounting to 4 parts a main fraction of 15 parts was collected. Both came over at 51°. There was considerable polymerization during distillation.

*Analysis.*—Calcd. for $C_6H_6$: C, 92.25; H, 7.75. Found: C, 92.54; H, 8.13.

The physical constants listed in the table above were determined on samples of ethinylbutadiene and divinylacetylene separated in the manner described and redistilled with special care at reduced pressure in a $CO_2$ atmosphere immediately before use.

The slightly volatile material obtained after the ethinylbutadiene had come over in the distillation of the crude copper acetylide with sodium cyanide was collected from several runs, dried and distilled at 3 mm. Almost all came over at 70° as a colorless liquid of faint aromatic odor. It was very unsaturated toward bromine and gave a heavy precipitate with ammoniacal silver nitrate.

$N_D^{20}$: 1.5272; $d_4^{20}$: 0.9327

This proved to be a dimer.

*Analysis.*—Calcd. for $C_{12}H_{12}$: C, 92.25; H, 7.75. Found: C, 91.81; H, 7.69.

Divinylacetylene recovered from the above treatment was substantially free from acetylenic hydrogen. When stabilized with pyrogallol and stored in a corked bottle in diffused daylight, it remained practically water-white for more than two months. The pure, unstabilized divinylacetylene when kept in the presence of a small quantity of air gelled in 6 hours at 85° or 6 days at room temperature. When distilled and sealed in high vacuum in the absence of air it still gelled in 6 days at room temperature if exposed to bright daylight and occasional direct sunlight. If stored in the dark, one month was required for gelation. Polymers formed in the dark were very nearly colorless; under other conditions they were pale yellow. The rapidity of gelation of pure divinylacetylene is greater than that observed for divinylacetylene containing ethinylbutadiene.

A thin layer of a viscous toluene solution of polymerized divinylacetylene (free from ethinylbutadiene) dried in 1.5 hours to a hard, smooth, very nearly colorless film. Exposed to bright sunlight, it darkened rapidly to the same depth of color as a simultaneously exposed film of ordinary polymerized divinylacetylene. The film derived from the pure divinylacetylene measured 0.00036 inch in thickness, however, while the film of ordinary polymerized divinylacetylene was only 0.00018 inch thick. Long exposure to sunlight did not further change the color. It therefore appears that the pure divinylacetylene gives polymers of somewhat improved light stability.

Example 2

A stream of nitrogen was passed thru crude divinylacetylene thereby entraining said crude divinylacetylene and then into a solution of silver nitrate in ethanol to which had been added enough ammonia to dissolve the silver oxide precipitate. A fine white crystalline precipitate of the silver derivative was formed at once. This was filtered and washed with ethanol, then air-dried. When dropped in small quantities upon the melting point block, it turned black at temperatures between 100° and 155°; at 155° it melted and almost immediately decomposed with a flash, while above 155° it decomposed instantaneously without melting.

It was insoluble in boiling acetone, boiling benzene, boiling ethanol, and in concentrated ammonia. It dissolved readily on warming with sodium cyanide solution or dilute nitric acid, giving a pronounced odor of ethinylbutadiene.

*Analysis.*—Calcd. for $AgC_6H_5$: C, 38.93; H, 2.73. Found: C, 38.67; H, 2.83.

The nitrogen stream after passing through the ammoniacal silver nitrate solution was conducted through a condenser cooled by means of solid carbon dioxide and acetone. The liquid products which were condensed were fractionally distilled under vacuum collecting a product boiling at 30 to 34° C. at 100 mm. pressure. This product continued substantially less ethinylbutadiene than the starting material, and if it was desired to reduce the content further, the process was repeated.

*Example 3*

The reagent consisted of 132 parts of mercuric chloride and 326 parts of potassium iodide dissolved in 326 parts of water and made alkaline with 275 parts of 10% sodium hydroxide. This was shaken for 14 hours with 160 parts of ethanol and 500 parts of crude divinylacetylene. The precipitate of mercury salt, after washing with ethanol, and air drying, weighed 85 parts. A portion crystallized from acetone gave a white product melting between 165° and 175° on a melting point block and decomposing above 175°.

*Analysis.*—Calcd. for $Hg(C_6H_5)_2$: C, 40.60; H, 2.84. Found: C, 40.64; H, 2.73.

The aqueous alcoholic solution (after precipitation and removal of the mercury salt of ethinylbutadiene) together with any separated, undissolved oil was diluted with water until any further dilution failed to cause the separation of additional water insoluble oil. The oily layer was separated, or if slow to separate, it was collected in a small volume of toluene, and was fractionally distilled in vacuum giving a product similar to that obtained in Example 2 and essentially free of ethinylbutadiene.

When ethinylbutadiene is to be precipitated in the form of one of its metal salts, it is preferable to effect the precipitation in an aqueous alkaline solution having a pH which is substantially on the alkaline side. As indicated above, a slightly acid pH does not render the process inoperable, altho a strongly acid pH does have such a tendency. As will be observed from the above examples, a suitable alkalinity may be produced by the incorporation of a basic substance such for instance as the ammonium hydroxide used with cuprous chloride. The basic substances may include alkali metal hydroxides or their equivalents, particularly sodium and potassium hydroxides, used in conjunction with mercury salts. The alkaline constituent is preferably ammonium, sodium or potassium hydroxide, selected to give a soluble reagent with the copper, silver or mercury salt.

The precipitation of ethinylbutadiene in the form of its metal salts may be carried out in the presence or absence of divinylacetylene. Generally, the salt forms at once at ordinary temperature, altho when a mercury salt is employed as the precipitant, it is advisable to agitate the reaction mixture for a considerable period to obtain maximum yields. Preferably, the metal salt which is to react with the ethinylbutadiene is present in molecular excess over the ethinylbutadiene. After its formation, the salt of ethinylbutadiene may be separated and purified as desired. Any divinylacetylene present may be distilled off, preferably at subatmospheric pressure and recovered.

In recovering the ethinylbutadiene from its metal salts, the presence of a wetting agent during the treatment with dilute acids or alkali cyanides will be found to be beneficial. Preferably, also the acid or cyanide will be added in substantial molecular excess to promote maximum recovery. Suitable dilute acids to be used in effecting the regeneration of the ethinylbutadiene include dilute nitric, dilute sulfuric, dilute phosphoric, and dilute hydrochloric acids. Cyanides capable of decomposing the metal salts of ethinylbutadiene are, for example, potassium cyanide and sodium cyanide.

Ethinylbutadiene is readily separated after the treatment with cyanides or dilute acids by either steam distillation or by solvent extraction. It may be further purified by fractional distillation. It should be noted, however, that the ethinylbutadiene is preferably stabilized against polymerization during distillation by the incorporation of an antioxidant.

A preferred method of separating divinylacetylene and ethinylbutadiene is precipitation of the latter in the form of a copper salt. Generally, this precipitation is carried out in the presence of water but in the formation of the mercury and silver salts as well as in the formation of the copper salt, another medium in which the salts are insoluble, such as an alcohol, for example, methanol, ethanol, and propanol, may be used. This method is particularly preferred where it is desired to recover the ethinylbutadiene as well as to purify the divinylacetylene.

Among the salts of cuprous copper, silver and mercury which may be used the following are examples of suitable salts, cuprous chloride, cuprous bromide, cuprous iodide, mercuric acetate, mercuric bromide, mercuric chloride, mercuric nitrate, silver nitrate, silver acetate, silver cyanide. Cupric salts which may be reduced to the cuprous state, for example by metallic copper or by hydroxylamine, and then used are exemplified by cupric acetate, cupric sulfate and cupric chloride. Cuprous salts (whether reduced from cupric salts or otherwise obtained) are the preferred embodiment of the invention, cuprous chloride being especially preferred.

In addition to the above described methods for separating divinylacetylene and ethinylbutadiene, it is also possible to effect a separation by precipitating the ethinylbutadiene in the form of its alkali and alkaline earth metal salts, such as its sodium or calcium salts. The precipitation is effected under anhydrous conditions but the free metals are used as the precipitants instead of their salts as in the case of copper, etc. Divinylacetylene may then be separated from the precipitated salts by filtration under oxygen-free conditions. Some ethinylbutadiene may be recovered from the alkali salts by washing the precipitate free of divinylacetylene with ether and carefully hydrolyzing with water or a water and ethanol mixture, for example. Preferably, the precipitation of the alkali salts is carried out in the presence of an inert solvent for the divinylacetylene, such as ether or liquid ammonia. It is also possible to effect the precipitation with alkali or alkaline earth metal amides instead of the free metals.

This invention provides a simple and convenient method of obtaining at the same time pure divinylacetylene and pure ethinylbutadiene from the crude divinylacetylene. The usefulness of the invention is thus obvious since no other method of separating these two hydrocarbons is known previous to this invention. Pure divinylacetylene, as has been mentioned above, gives polymers having an increased stability toward light; on the other hand, it remains (when stabilized) colorless and unaltered for long periods of time.

Ethinylbutadiene is susceptible of a variety of applications. Its polymers may be used to the same purpose as divinylacetylene polymers (synthetic resins, drying oils, etc.) and as modifying agents for other resins and compositions. Ethinylbutadiene, thru its unsaturation and acetylenic hydrogen, is well adapted to the synthesis of almost innumerable useful derivatives of which a large number will themselves be polymerizable. Among these derivatives may be cited the reaction products obtainable with $Cl_2$, $Br_2$, HCl, HBr, alcohols, phenols, and acids as well as the hydration product, partial hydrogenation products, etc.

It is apparent that many widely different embodiments of this invention may be made without departing from the spirit and scope thereof and therefore it is not intended to be limited except as indicated in the appended claims.

I claim:

1. A method of separating divinylacetylene and ethinylbutadiene which comprises bringing a composition containing divinylacetylene and ethinylbutadiene into contact with a solution of a metal salt of the group consisting of cuprous copper salts, silver salts and mercury salts, which solution is more alkaline than about pH 6.9.

2. A method of separating divinylacetylene and ethinylbutadiene which comprises bringing a composition containing divinylacetylene and ethinylbutadiene into contact with an aqueous alkaline solution of a metal salt of the group consisting of cuprous copper salts, silver salts and mercury salts.

3. A method of separating divinylacetylene and ethinylbutadiene which comprises bringing a composition containing divinylacetylene and ethinylbutadiene into contact with an aqueous solution of a metal salt of the group consisting of cuprous copper salts, silver salts and mercury salts, which solution is more alkaline than about pH 6.9, distilling off divinylacetylene, and regenerating ethinylbutadiene by treating the precipitated metal salt of ethinylbutadiene with an alkali cyanide.

4. A method of preparing divinylacetylene which is substantially free of ethinylbutadiene which comprises bringing a composition containing divinylacetylene and ethinylbutadiene into contact with a solution of a metal salt of the group consisting of cuprous copper salts, silver salts and mercury salts, which solution is more alkaline than about pH 6.9 and distilling off the divinylacetylene.

5. A method of preparing divinylacetylene which is substantially free of ethinylbutadine which comprises bringing a composition containing divinylacetylene and ethinylbutadiene into contact with an alkaline aqueous solution of a cuprous copper salt, and distilling off the divinylacetylene.

6. A method of preparing divinylacetylene which is substantially free of ethinylbutadiene which comprises bringing a composition containing divinylacetylene and ethinylbutadiene into contact with an aqueous ammoniacal solution of cuprous chloride, and distilling off the divinylacetylene.

7. A method of preparing ethinylbutadiene which is substantially free of divinylacetylene which comprises bringing a composition containing divinylacetylene and ethinylbutadiene into contact with a solution of a metal salt of the group consisting of cuprous copper salts, silver salts and mercury salts, which solution is more alkaline than about pH 6.9, separating out the resulting precipitate and treating said precipitate with an alkali cyanide.

8. A method of preparing ethinylbutadine which is substantially free of divinylacetylene which comprises bringing a composition containing divinylacetylene and ethinylbutadiene into contact with an alkaline aqueous solution of a cuprous salt, separating out the resulting precipitate and treating said precipitate with an alkali cyanide.

9. A method of preparing ethinylbutadiene which is substantially free of divinylacetylene which comprises bringing a composition containing divinylacetylene and ethinylacetylene into contact with an aqueous ammoniacal solution of cuprous chloride, separating out the resulting precipitate, treating said precipitate with sodium cyanide and steam distilling off the then liberated ethinylbutadiene.

10. A method of preparing ethinylbutadiene which comprises liberating ethinylbutadiene by treating a metal salt thereof with an alkali cyanide.

11. A method of separating divinylacetylene and ethinylbutadiene which comprises bringing a composition containing divinylacetylene and ethinylbutadiene into contact with an aqueous solution of a metal salt of the group consisting of cuprous copper salts, silver salts, and mercury salts, which solution is more alkaline than about pH 6.9, distilling off divinylacetylene, and regenerating ethinylbutadiene by treating the precipitated metal salt of ethinylbutadiene with a dilute acid.

12. A method of preparing ethinylbutadiene which is substantially free of divinylacetylene which comprises bringing a composition containing divinylacetylene and ethinylbutadiene into contact with a solution of a metal salt of the group consisting of cuprous copper salts, silver salts, and mercury salts, which solution is more alkaline than about pH 6.9, separating out the resulting precipitate and treating said precipitate with a dilute acid.

13. A method for preparing ethinylbutadiene which comprises liberating ethinylbutadiene by treating a metal salt thereof with a dilute acid.

ALBERT S. CARTER.

CERTIFICATE OF CORRECTION.

Patent No. 2,228,752. January 14, 1941.

ALBERT SMITH CARTER.

It is hereby certified that error appears in the printed specification of the above numbered patent requiring correction as follows: Page 2, second column, line 9, for "$d_4^{10}$" read --$d_4^{20}$--; and that the said Letters Patent should be read with this correction therein that the same may conform to the record of the case in the Patent Office.

Signed and sealed this 18th day of February, A. D. 1941.

(Seal)

Henry Van Arsdale,
Acting Commissioner of Patents.